(12) United States Patent
Hino et al.

(10) Patent No.: US 7,744,969 B2
(45) Date of Patent: Jun. 29, 2010

(54) RETARDATION FILM AND METHOD FOR PRODUCTION THEREOF

(75) Inventors: Kyoko Hino, Sodegaura (JP); Toshihiko Suzuki, Niihama (JP); Hiroaki Takahata, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 45 days.

(21) Appl. No.: 12/293,347

(22) PCT Filed: Mar. 23, 2007

(86) PCT No.: PCT/JP2007/057009

§ 371 (c)(1),
(2), (4) Date: Sep. 30, 2008

(87) PCT Pub. No.: WO2007/108562

PCT Pub. Date: Sep. 27, 2007

(65) Prior Publication Data

US 2009/0227756 A1 Sep. 10, 2009

(30) Foreign Application Priority Data

Mar. 23, 2006 (JP) ............................. 2006-080237

(51) Int. Cl.
*C09K 19/00* (2006.01)
*C08F 10/06* (2006.01)
(52) U.S. Cl. ..................... 428/1.1; 526/348.1; 526/351; 264/1.34; 264/290.2; 264/901; 349/117
(58) Field of Classification Search ............. 526/348.1, 526/351; 264/1.34, 290.2, 901; 428/1.1; 349/117
See application file for complete search history.

(56) References Cited

U.S. PATENT DOCUMENTS 3,324,218 A * 6/1967 Gebler et al. ............ 526/348.1
4,405,775 A * 9/1983 Hashimoto ................. 526/351
5,543,948 A 8/1996 Takahashi et al.
6,965,474 B2 * 11/2005 Johnson et al. ............. 359/500

FOREIGN PATENT DOCUMENTS

| EP | 0 669 542 A1 | 8/1995 |
|---|---|---|
| JP | 49-82777 A | 8/1974 |
| JP | 60-24502 A | 2/1985 |
| JP | 2-256003 A | 10/1990 |
| JP | 3-21902 A | 1/1991 |
| JP | 07-256749 A | 10/1995 |
| JP | 2000-9934 A | 1/2000 |
| JP | 2004-78247 A | 3/2004 |
| JP | 2005-254812 A | 9/2005 |
| JP | 2007-253377 A | 10/2007 |
| JP | 2007-316603 A | 12/2007 |

* cited by examiner

*Primary Examiner*—Fred M Teskin
(74) *Attorney, Agent, or Firm*—Sughrue Mion, PLLC

(57) ABSTRACT

The present invention provides a method for producing a retardation film of a polypropylene resin, the method comprising subjecting a film of a polypropylene resin to longitudinal stretching and transverse stretching which are performed sequentially, wherein the transverse stretching comprises the following steps, and a polypropylene resin retardation film which is obtained by such a method and has both a high axial retardation and a uniform retardation:

a step of preheating the film at a preheating temperature which is equal to or higher than the melting point of the polypropylene resin;

a step of stretching the preheated film in the transverse direction at a stretching temperature which is lower than the preheating temperature; and a step of heat setting the film stretched in the transverse direction.

6 Claims, No Drawings

RETARDATION FILM AND METHOD FOR PRODUCTION THEREOF

TECHNICAL FIELD

The present invention relates to a retardation film made of a polypropylene resin and to a method for the production thereof.

BACKGROUND ART

Liquid crystal display devices usually have a combination of a liquid crystal and a retardation film. Retardation films obtained by converting a polycarbonate resin, a cyclic olefin-based polymer resin, or the like into a film and further stretching the film are known (see, for example, JP-A 7-256749 and JP-A 5-2108). Regrettably, however, raw material resins of such films are expensive. Therefore, development of retardation films made of inexpensive plastic materials has been demanded.

For example, JP-A 60-24502 discloses a phase retardation plate made of a polyolefin resin. According to this document, this phase retardation plate is produced by drawing a resin extruded through an outlet of a T-die while cooling it so that the resin will be stretched to a certain degree. However, films obtained by such a method comprising stretching uniaxially in the longitudinal direction are not suited as retardation film because they have retardation unevenness due to uneven orientation in the film width direction or have thickness unevenness in the width direction.

DISCLOSURE OF THE INVENTION

Objects of the present invention are to provide a polypropylene resin retardation film having both a high axial accuracy and a uniform retardation and to provide a method for the production thereof.

In one aspect, the present invention provides a method for producing a retardation film of a polypropylene resin, the method comprising subjecting a film of a polypropylene resin to longitudinal stretching and transverse stretching which are performed sequentially, wherein the transverse stretching comprises the following steps:

a step of preheating the film at a preheating temperature which is equal to or higher than the melting point of the polypropylene resin;

a step of stretching the preheated film in the transverse direction at a stretching temperature which is lower than the preheating temperature; and a step of heat-setting the film stretched in the transverse direction.

In another aspect, the present invention provides a retardation film of a polypropylene resin obtained by the aforementioned method.

BEST MODE FOR CARRYING OUT THE INVENTION

The polypropylene resin which constitutes the retardation film of the present invention is a homopolymer of propylene or a copolymer of propylene with one or more kinds of monomers selected from the group consisting of ethylene and α-olefins having 4 to 20 carbon atoms. Mixtures thereof may also be used.

Specific examples of the α-olefins include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, 2-methyl-1-hexene, 2,3-dimethyl-1-pentene, 2-ethyl-1-pentene, 1-octene, 2-ethyl-1-hexene, 3,3-dimethyl-1-hexene, 2-propyl-1-heptene, 2-methyl-3-ethyl-1-heptene, 2,3,4-trimethyl-1-pentene, 2-propyl-1-pentene, 2,3-diethyl-1-butene, 1-nonene, 1-decene, 1-undecene, 1-dodecene, 1-tridecene, 1-tetradecene, 1-pentadecene, 1-hexadecene, 1-heptadecene, 1-octadecene and 1-nonadecene. Among such α-olefins, α-olefins having 4 to 12 carbon atoms are preferable. Among them, 1-butene, 1-pentene, 1-hexene and 1-octene are more preferable, and 1-butene and 1-hexene are particularly preferable.

The polypropylene resin preferably is a propylene-ethylene copolymer or a propylene-1-butene copolymer. When the polypropylene resin is a copolymer made up of propylene and one or more kinds of monomer selected from the group consisting of ethylene and α-olefins having 4 to 20 carbon atoms, the copolymer may be either a random copolymer or a block copolymer.

A polypropylene resin having a parameter (A) determined by a test for resin selection described below is within the range of 0.07 to 1.0 is preferred because a retardation film with high optical uniformity can be obtained. Examples of the polypropylene resin having a parameter (A) of 0.07 to 1.0 include propylene-based random copolymers.

<Test for Resin Selection>

A film with a thickness of 0.1 mm is prepared by hot press molding a polypropylene resin. In the hot press molding, after preheating of the resin at 230° C. for 5 minutes, the pressure is increased to 100 kgf/cm² at that temperature over 3 minutes and then that pressure is maintained for 2 minutes. Then, the resin is cooled at 30° C. under a pressure of 30 kgf/cm² for 5 minutes. Then, in a stress-strain curve (S-S curve) observed when the resulting film is stretched at a temperature such that the stress is 10±1 kgf/cm² at a tensile test speed of 100 mm/min and a strain of 200% in accordance with JIS K7113, a parameter (A) is determined from Formula (3). In this tensile test, a tensile tester equipped with a thermostatic chamber is used and the tensile test is carried out in the thermostatic chamber.

$$\text{Parameter } (A) \text{ (\%·kg/cm}^2\text{)} = \{B_{600}(\text{stress at a 600\% stain}) - B_{200}(\text{stress at a 200\% strain})\}/400 \quad \text{Formula (3)}$$

Examples of the propylene-based random copolymers include propylene-based random copolymers obtained by copolymerizing propylene with one or more kinds of monomer selected from the group consisting of ethylene and α-olefins having 4 to 20 carbon atoms.

Specific examples of the α-olefins having 4 to 20 carbon atoms include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, 2-methyl-1-hexene, 2,3-dimethyl-1-pentene, 2-ethyl-1-pentene, 1-octene, 2-ethyl-1-hexene, 3,3-dimethyl-1-hexene, 2-propyl-1-heptene, 2-methyl-3-ethyl-1-heptene, 2,3,4-trimethyl-1-pentene, 2-propyl-1-pentene, 2,3-diethyl-1-butene, 1-nonene, 1-decene, 1-undecene, 1-dodecene, 1-tridecene, 1-tetradecene, 1-pentadecene, 1-hexadecene, 1-heptadecene, 1-octadecene and 1-nonadecene. Among such α-olefins, α-olefins having 4 to 12 carbon atoms are preferable.

Examples of the propylene-based random copolymer include propylene-ethylene random copolymers, propylene-α-olefin random copolymers and propylene-ethylene-α-olefin random copolymers. More specifically, examples of the propylene-α-olefin random copolymers include propylene-1-butene random copolymers, propylene-1-hexene random copolymers and propylene-1-octene random copolymers. Examples of the propylene-ethylene-α-olefin random copolymers include propylene-ethylene-1-butene random copolymers, propylene-ethylene-1-hexene random copolymers and propylene-ethylene-1-octene random copolymers. Preferred are propylene-ethylene random copolymers, propylene-1-butene random copolymers, propylene-1-hexene random copolymers, propylene-ethylene-1-butene random copolymers and propylene-ethylene-1-hexene random copolymers.

When the polypropylene resin is a copolymer, the content of the constitutional units in the copolymer derived from comonomers preferably is more than 0% by weight and not more than 40% by weight, more preferably is more than 0% by weight and not more than 20% by weight, and even more preferably is more than 0% by weight and not more than 10% by weight, from the viewpoint of balance between transparency and heat resistance. When the polypropylene resin is a copolymer of propylene and two or more kinds of comonomers, it is preferable that the total content of all the constitutional units derived from comonomers contained in the copolymer be within the aforesaid ranges.

The melt flow rates (MFR) of the polypropylene resin usually is from 0.1 to 200 g/10 min, and preferably is from 0.5 to 50 g/10 min as measured at a temperature of 230° C. and a load of 21.18 N in accordance with JIS K7210. When a propylene-based polymer having an MFR within such a range is used, a film shows only a small sag in longitudinal stretching and transverse stretching and therefore is easy to stretch uniformly.

The molecular weight distribution of the polypropylene resin is defined by the ratio of the weight average molecular weight Mw to the number average molecular weight Mn and it usually is from 1 to 20. Mn and Mw are measured by GPC using o-dichlorobenzene at 140° C. as a solvent and polystyrenes as standard samples.

The melting point of the polypropylene resin usually is from 120 to 170° C. The melting point is defined as the temperature at which a peak with the greatest intensity appears in a melting curve measured with a differential scanning calorimeter (DSC) and it is the melting peak temperature determined when 10 mg of a pressed film of a polypropylene resin is heat-treated at 230° C. for 5 minutes under a nitrogen atmosphere, followed by cooling at a rate of 10° C./min to 30° C., maintaining the temperature at 30° C. for 5 minutes, and heating from 30° C. to 230° C. at a rate of 10° C./min.

Examples of the method of producing the polypropylene resin include a method in which propylene is homopolymerized using a conventional catalyst for polymerization, and a method in which propylene is copolymerized with one or more kinds of monomers selected from the group consisting of ethylene and α-olefins having 4 to 20 carbon atoms.

Examples of the conventional polymerization catalyst include:

(1) Ti—Mg catalysts comprising a solid catalyst component containing magnesium, titanium and halogen as essential ingredients, (2) catalyst systems in which a solid catalyst component containing magnesium, titanium and halogen as essential ingredients is combined with an organoaluminum compound and, if needed, a third component such as an electron donative compound, and (3) metallocene catalysts.

Among such catalyst systems, the catalyst systems in which a solid catalyst component containing magnesium, titanium and halogen as essential ingredients is combined with an organoaluminum compound and, if needed, a third component such as an electron donative compound can be used most commonly as a catalyst system for use in the production of a propylene-based polymer. More specifically, preferable examples of the organoaluminum compound include triethylaluminum, triisobutylaluminum, a mixture and triethylaluminum and diethylaluminum chloride, and tetraethyldialumoxane. Preferable examples of the electron donative compound include cyclohexylethyldimethoxysilane, tert-butyl-n-propyldimethoxysilane, tert-butylethyldimethoxysilane, and dicyclopentyldimethoxysilane. Examples of the solid catalyst component containing magnesium, titanium and halogen as essential ingredients include the catalyst system disclosed in the JP-A 61-218606, 61-287904 and 7-216017. Examples of the metallocene catalysts include the catalyst systems disclosed in Japanese Patent Nos. 2587251, 2627669 and 2668732.

Examples of the polymerization method to be used for the preparation of the polypropylene resin include a solvent polymerization process, which uses an inert solvent represented by hydrocarbon compounds such as hexane, heptane, octane, decane, cyclohexane, methylcyclohexane, benzene, toluene and xylene, a bulk polymerization process, which uses a liquefied monomer as a solvent, and a gas phase polymerization process, which is performed in a gaseous monomer. The bulk polymerization process or the gas phase polymerization process is preferably used. Such polymerization methods may be either in a batch mode or a continuous mode.

The stereoregularity of the polypropylene resin may be in any of isotactic form, syndiotactic form, and atactic form. From the viewpoint of heat resistance, the polypropylene resin is a syndiotactic or isotactic propylene-based polymer.

The polypropylene resin may be a blend of two or more kinds of polypropylene polymers differing in molecular weight, proportion of constitutional units derived from propylene, tacticity, etc. Moreover, it may appropriately contain a polymer other than a polypropylene polymer or additives.

Examples of the additives which the polypropylene resin may contain include an antioxidant, a UV absorber, an antistatic agent, a lubricant, a nucleating agent, an anticlouding agent, an antiblocking agent, etc. Examples of the antioxidant include phenolic antioxidants, phosphorus-containing antioxidants, sulfur-containing antioxidants, hindered amine antioxidants (HALS), and composite antioxidants with a unit having, for example, a phenolic and phosphorus-type antioxidant mechanism in one molecule. Examples of the UV absorber include 2-hydroxybenzophenone-based UV absorbers, hydroxytriazole-based UV absorbers, and benzoate-based UV screening agents. Examples of the antistatic agent include polymer-type, oligomer-type and monomer-type antistatic agents. Examples of the lubricant include higher fatty acid amides, such as erucamide and oleamide, higher fatty acids, such as stearic acid, and their metal salts. Examples of the nucleating agent include sorbitol-based nucleating agents, organophosphate salt nucleating agents, and macromolecule-type nucleating agents such as polyvinyl cycloalkane. As the antiblocking agent, inorganic or organic fine particles having a spherical shape or a shape close to a spherical shape may be used. As each of the aforementioned additives, a plurality of species may be used in combination.

The retardation film of the present invention is produced by stretching a primary film made of a polypropylene resin under the conditions described previously. It is preferable to use a film which is optically uniform and non-oriented or almost non-oriented as the primary film. Specifically, it is preferable to use a film having an in-plane retardation of 30 nm or less.

The method for producing a primary film includes a solvent cast method and an extrusion forming method. The former method is a method of forming a film on a base material by casting a solution prepared by dissolving a thermoplastic resin in an organic solvent, onto a base material such as a biaxially-stretched, releasable polyester film by use of a die coater, followed by drying it to remove the organic solvent. The film formed on the base material by such a method is removed from the base material and then is used as a primary film. The latter method is a method of obtaining a film by melting and kneading a thermoplastic resin in an extruder, followed by extruding it through a T-die and then drawing it while cooling it to solidify in contact with a roll. A polypropylene resin film produced by this method is used as a primary film directly for the method of the present invention. From the viewpoint of production cost of a primary film, the extrusion forming method is preferred.

In production of a primary film by a T-die extrusion forming method, examples of the method of cooling and solidifying a molten material extruded from a T-die include a method of cooling by using a casting roll and an air chamber, a method of pressing between a casting roll and a touch roll, and a method of pressing between a casting roll and an endless metal belt which is arranged so as to be perimetrically in pressed contact with the casting roll. When using a casting roll for cooling, it is preferable, in order to obtain a retardation film with better transparency, that the surface temperature of the casting roll to be used be from 0 to 30° C.

When producing a primary film by the method of pressing between a casting roll and a touch roll, it is preferable, in order to obtain an almost non-oriented primary film, to use, as the touch roll, a rubber roll or a roll having a structure containing an outer tube composed of an elastically-deformable endless metal belt and a roll which is arranged inside the outer tube and which is made of an elastically-deformable elastic material, where the space between the outer tube and the elastic material roll is filled up with a medium for temperature control.

In the case of using a rubber roll as the touch roll, it is preferable, for obtaining a retardation film having a mirror surface, to press the molten material extruded through a T-die with the casting roll and the rubber roll therebetween together with a support. A biaxially stretched film having a thickness of from 5 to 50 μm made of a thermoplastic resin is preferred as the support.

When a primary film is produced by the method of pressing between a casting roll and an endless metal belt arranged so as to be perimetrically in pressed contact with the casting roll, it is preferable that the endless belt be supported by a plurality of rolls arranged along the perimetrical direction of a casting roll in parallel to the casting roll. It is more preferable that the endless belt be supported by two rolls having a diameter of from 100 to 300 mm and that the endless belt be from 100 to 500 in thickness.

In order to obtain a retardation film having better optical uniformity, it is preferable that the primary film to be subjected to stretching have less thickness unevenness. The difference between the maximum and minimum values of the thickness of the primary film is preferably 10 μm or less, and more preferably 4 μm or less.

By subjecting a primary film obtained by, for example, one of the aforementioned methods to longitudinal stretching and transverse stretching sequentially, it is possible to obtain a retardation film made of a polypropylene resin. Regarding stretching, it is permissible to perform the longitudinal stretching first and then perform the transverse stretching, and it is also permissible to perform the transverse stretching first and then perform the longitudinal stretching.

Examples of the method of the longitudinal stretching include a method of stretching a primary film using the rotation rate difference between two or more rolls and a long-span stretching method. The long-span stretching method is a method using a longitudinal stretching machine having two pairs of nip rolls and an oven positioned therebetween in which a primary film is stretched due to the rotation rate difference between the two pairs of nip rolls while being heated in the oven. The long-span longitudinal stretching method is preferred because a retardation film with high optical uniformity can be obtained. In particular, use of an air floating oven is preferable. The air floating oven has a structure such that when a primary film is introduced into the oven, it may be possible to blow hot air to both sides of the primary film from upper nozzles and lower nozzles. The upper nozzles and the lower nozzles are disposed alternately along the conveyance direction of the film. In the oven, the primary film is stretched so as not to come into contact with the upper nozzles or the lower nozzles. The stretching temperature in this occasion (namely, the temperature of the atmosphere in the oven) preferably is not lower than 90° C. and not higher than the melting point of the polypropylene resin. In the event that the oven is divided into two or more zones, the temperatures of the zones may be either the same of different.

While the longitudinal stretching ratio is not limited, it usually is from 1.01 to 2, and preferably is from 1.05 to 1.8 because a retardation film having better optical uniformity can be obtained.

The transverse stretching process has the following steps:

a step of preheating the film at a preheating temperature which is equal to or higher than the melting point of the polypropylene resin;

a step of stretching the preheated film in the transverse direction at a stretching temperature which is lower than the preheating temperature; and a step of heat setting the film stretched in the transverse direction.

A representative method of transverse stretching is a tenter method. The tenter method is a method of stretching a primary film whose both edges in the film width direction are fixed with chucks by enlarging the chuck interval in an oven. In the tenter method, a machine is used in which the oven temperatures of a zone where a preheating step is performed, a zone where a stretching step is performed and a zone where a heat setting step is performed can be controlled independently. By performing transverse stretching under the aforementioned conditions, it is possible to obtain a retardation film which is excellent in axial accuracy and which has uniform retardation.

The preheating step in the transverse stretching is a step provided before the step of stretching a film in the transverse direction, and it is a step of heating a film to a temperature high enough for stretching the film. The preheating temperature in the preheating step means the temperature of the atmosphere in the zone where the preheating step is performed in the oven, and it is a temperature which is not lower than the melting point of the polypropylene resin of a film to be stretched. The preheating temperature has a great influence on the axis accuracy of a retardation film to be obtained, and if the preheating temperature is lower than the melting point, it is impossible to achieve a uniform retardation in a retardation film to be obtained. The preheating step residence time of a film to be stretched preferably is from 30 to 120 seconds. If the residence time in the preheating step is less than 30 seconds, stress may scatter when the film is stretched during the stretching step and an adverse influence may be caused on the uniformity of axis and retardation as a retardation film. If the residence time is more than 120 seconds, the film will receive an unnecessarily large amount of heat to melt partly, so that the film may sag. It is more preferable that the preheating step residence time be from 30 to 60 seconds.

The stretching step in the transverse stretching is a step of stretching a film in the transverse direction. The stretching temperature in this stretching step, which means the temperature of the atmosphere in the zone where the stretching step is performed in an oven, is a temperature lower than the preheating temperature. By stretching the preheated film at a temperature lower than the preheating step, it becomes possible to stretch the film uniformly and, as a result, a retardation film excellent in uniformity of optical axis and retardation can be obtained. The stretching temperature preferably is from 5 to 20° C. lower, and more preferably from 7 to 15° C. lower than the preheating temperature in the preheating step.

The heat-setting step in the transverse stretching is a step of passing a film through an atmosphere at a predetermined temperature in an oven while maintaining the film at a width which the film had at the completion of the stretching step. In order to effectively improve the stability of optical characteristics of a film such as retardation and optical axis, the heat setting temperature is preferably within the range of from a temperature 5° C. lower than the stretching temperature in the stretching step to a temperature 30° C. higher than the stretching step.

The process of transverse stretching may further have a heat relaxation step. In the tenter method, this step usually is performed between the stretching zone and the heat setting zone and it is performed in a heat relaxation zone the temperature of which can be controlled independently from other zones. Specifically, the heat relaxation is performed by stretching a film to a predetermined width in the stretching step and then reducing chuck intervals by several percent (normally, 0.5 to 7%) to remove a needless distortion.

While the retardation which a retardation film is required to have varies depending upon the kind of a liquid crystal display device into which the retardation film is incorporated, the in-plane retardation $R_0$ normally is from 30 to 300 nm. When being used in a vertical alignment mode liquid crystal display described below, it is preferable, from the viewpoint of being excellent in viewing angle characteristics, that the in-plane retardation $R_0$ be from 40 to 70 nm and that the thickness direction retardation $R_{th}$ be from 90 to 230 nm. The thickness of the retardation film normally is from 10 to 100 μm, and preferably from 10 to 60 μm. By controlling the stretching ratio in the production of a retardation film and the thickness of a retardation film to be produced, a retardation film having a desired retardation can be obtained.

The retardation film produced by the method described above is a retardation film having high optical uniformity which has a difference between the maximum and minimum retardation values in a film plane (within a region of 500 mm in width and 500 mm in length) of 10 nm or less and an optical axis of from −1° to +1° when an optical axis is measured over 500 mm in the width direction of the film.

The retardation film of the present invention is laminated with various polarizing plates, liquid crystal layers, etc., and preferably is used as liquid crystal display devices of cellular phones, mobile information terminals (Personal Digital Assistant: PDA), personal computers, large-sized televisions, etc. Examples of the liquid crystal display devices (LCD) in which the retardation film of the present invention is laminated and used include liquid crystal display devices of various modes such as optical compensation bend (OCB) mode, vertical alignment (VA) mode, in-plane switching (IPS) mode, thin film transistor (TFT) mode, twist nematic (TN) mode, and super twist nematic (STN) mode. In particular, it is effective for improving the viewing angle dependency when using in a liquid crystal display device in VA mode. Liquid crystal display devices generally have polarizing plates disposed on each side of a liquid crystal cell having two substrates and a liquid crystal layer sandwiched therebetween and are generally configured so that among the lights emitted from a backlight disposed on the outside of one of the polarizing plates (on the rear side), only straight polarized lights parallel to the transmission axis of the polarizing plate disposed between the liquid crystal cell and the backlight will enter the liquid crystal cell. The retardation film of the present invention may be placed between the rear polarizing plate and the liquid crystal cell and/or between the front polarizing plate and the liquid crystal cell with intervention of a pressure-sensitive adhesive. While polarizing plates usually are configured to have two protective films such as triacetylcellulose (TAC) films for protecting a polarizing film made of polyvinyl alcohol and to sandwich the polarizing film between the protective films with intervention of an adhesive, the retardation film of the present invention can serve as both an optical compensation film (i.e., retardation film) and a protective film when it is adhered, instead of a liquid crystal cell-side protective film(s) of a front polarizing plate and/or of a rear polarizing plate, to a polarizing film with an adhesive.

EXAMPLES

The present invention is described with reference to examples, but the invention is not limited to the examples.

(1) Test for Resin Selection

A film with a thickness of 0.1 mm was prepared by hot press molding a polypropylene resin. In the hot press molding, after preheating of the resin at 230° C. for 5 minutes, the pressure was increased to 100 kgf/cm² at that temperature over 3 minutes and then that pressure was maintained for 2 minutes. Then, the resin was cooled at 30° C. under a pressure of 30 kgf/cm² for 5 minutes. Then, in a stress-strain curve (S-S curve) observed when the resulting film is stretched at a temperature such that the stress is 10±1 kg/cm² at a tensile test speed of 100 mm/min and a strain of 200% in accordance with JIS K7113, a parameter (A) was determined from Formula (3). In the tensile test, a tensile tester equipped with a thermostatic chamber was used and the tensile test was carried out in the thermostatic chamber.

$$\text{Parameter }(A)\ (\%\cdot\text{kg/cm}^2) = \{B_{600}(\text{stress at a 600\% stain}) - B_{200}(\text{stress at a 200\% strain})\}/400$$

A film with a thickness of 0.5 mm was prepared by hot press molding a polypropylene resin. In the hot press molding process, after preheating of a propylene-based polymer at 230° C. for 5 minutes in a hot pressing machine, the pressure was increased to 50 kgf/cm² over 3 minutes and then maintained for 2 minutes, and subsequently the polymer was pressed while being cooled at 30° C. and 30 kgf/cm² for 5 minutes. For a 10 mg piece of the prepared press sheet, the following heat histories [1] through [5] were applied under a nitrogen atmosphere using a differential scanning calorimeter (DSC-7, produced by PerkinElmer, Inc.) and then it was heated from 50° C. to 180° C. at a rate of 5° C./min to produce a melting curve. In the melting curve, the temperature (° C.) at which the highest endothermic peak appeared was determined and this temperature was defined as the melting point (Tm) of the propylene-based resin.

[1] Heating at 220° C. for 5 minutes.
[2] Cooling from 220° C. to 150° C. at a rate of 300° C./min.
[3] Keeping at 150° C. for 1 min.
[4] Cooling from 150° C. to 50° C. at a rate of 5° C./min.
[5] Keeping at 50° C. for 1 min.

(3) Melt Flow Rate (MFR)

The melt flow rate was measured at a temperature of 230° C. and a load of 21.18 N in accordance with JIS K7210.

(4) Ethylene Content

For a propylene-ethylene copolymer, the content of constitutional units derived from ethylene in the copolymer was determined by performing IR spectrum measurement disclosed in "Macromolecule Analysis Handbook" (published by Kinokuniya Co. Ltd., 1995), page 616.

(5) Amount of Xylene-Soluble Component

One gram of a sample of a polypropylene resin was dissolved completely in 100 ml of boiling xylene, followed by cooling to 20° C. and leaving at rest at that temperature for 4 hours. Then, it was separated into a deposited solid and a filtrate by filtration, and then xylene was removed by evaporation and a resulting solid was dried at 70° C. under reduced pressure. The percentage of the weight of the dried residue to the weight of the aforementioned sample (1 g) was defined as the amount of 20° C. xylene-soluble components (CXS) of the propylene-based resin.

(6) In-Plane Retardation $R_0$ and Thickness Direction Retardation $R_{th}$

The in-plane retardation was measured in a region of 500 mm in width and 500 mm in length of a retardation film using a retardation analyzer (KOBRA-CCD manufactured by Oji Scientific Instruments). The thickness direction retardation $R_{th}$ was measured in a central portion of the retardation film using the retardation analyzer (KOBRA-WPR manufactured by Oji Scientific Instruments).

(7) Optical Axis Angle

The optical axis angle was measured with a polarization microscope at 20-mm intervals within a range of 500 mm in width of a retardation film.

Example 1

A polypropylene resin (a propylene-ethylene random copolymer, parameter (A) determined by a test for resin selection=0.011, Tm=136° C., MFR=8 g/10 min, ethylene content=4.6% by weight, CXS=4%, produced by Sumitomo Chemical Co., Ltd., commercial name: NOBLEN W151) was charged into a 65 mmφ extruder, the cylinder temperature of which was adjusted to 200° C. The resin was then melt-kneaded therein, followed by extrusion through a 1200 mm-wide T-die attached to the extruder at an extrusion rate of 65 kg/h. The extruded molten polypropylene resin was pressed to cool between a 400 mmφ casting roll adjusted to 12° C. and a touch roll composed of an outer tube composed of a metal sleeve adjusted to 12° C. and an elastic roll arranged inside the outer tube. Thus, a 200 µm thick polypropylene resin film was obtained. The air gap was 115 mm, and the distance over which the molten polypropylene resin was pressed between the casting roll and the touch roll was 20 mm. The resulting polypropylene resin film was introduced into a long-span longitudinal stretching machine having an air floating oven arranged between two pairs of nip rolls, and was subjected to longitudinal stretching. The air floating oven was divided into two zones, each of which had a length of 1.5 m. The longitudinal stretching conditions were: the temperature of the first zone=128° C., the temperature of the second zone=132° C., the speed at the inlet=8 m/min, and the stretching ratio=1.5. The longitudinally stretched film had a thickness of 170 µm, an average of in-plane retardation $R_0$ of 1290 nm, and a thickness direction retardation $R_{th}$ of 720 nm.

Furthermore, this longitudinally stretched film was subjected to transverse stretching by the tenter method to obtain a retardation film. The transverse stretching conditions were: the temperature of a preheating zone=141° C., the temperature of a stretching zone=131° C., the temperature of a heat setting zone=131° C., and the stretching ratio=3.5.

The resulting retardation film was measured for its $R_0$, $R_{th}$, and optical axis accuracy. The average of $R_0$ was 70 nm, the difference between the maximum and minimum values of $R_0$ was 6 nm, the $R_{th}$ was 200 nm, the optical axis angle was from −0.5° to +0.50, and therefore this retardation film was high in optical uniformity. This retardation film was disposed on the rear side of a VA-mode liquid crystal cell in the order, a pressure-sensitive adhesive, the retardation film, a pressure-sensitive adhesive, and a polarizing plate, from the liquid crystal cell substrate. On the front side of the liquid crystal cell, a pressure-sensitive adhesive and a polarizing plate were disposed in this order. A backlight was disposed on the rear side of this liquid crystal display device. The liquid crystal cell was evaluated for its viewing angle dependency on the basis of the degree of light leakage caused by change in viewing angle in a black display state where no voltage was applied. If less light leakage was recognized when viewed from any direction, the viewing angle dependency is low and the retardation film is judged to have good viewing angle characteristic. It was confirmed that the liquid crystal display device of this example leaked only a small amount of light when it was viewed from either the normal direction or the oblique direction and, therefore, it was superior in viewing angle characteristic.

Example 2

A polypropylene resin NOBLEN W151 was charged into a 90 mmφ extruder, the cylinder temperature of which was adjusted to 250° C. The resin was then melt-kneaded therein, followed by extrusion through a 1250 mm-wide T die attached to the extruder at an extrusion rate of 100 kg/h. The extruded molten polypropylene resin was cooled with a casting roll adjusted to 10° C. and an air chamber to obtain a 160 µm thick polypropylene resin film. The air gap was as wide as 90 mm. The resulting polypropylene resin film was introduced into a long-span longitudinal stretching machine having an air floating oven arranged between two pairs of nip rolls, and was subjected to longitudinal stretching. The air floating oven was divided into two zones, each of which had a length of 2 m. The longitudinal stretching conditions were: the temperature of the first zone=125° C., the temperature of the second zone=129° C., the speed at the inlet=8 m/min, and the stretching ratio=1.5. The longitudinally stretched film had a thickness of 130 µm, an $R_0$ of 910 nm, and an $R_{th}$ of 510 nm.

Furthermore, this longitudinally stretched film was subjected to transverse stretching by the tenter method to obtain a retardation film. The transverse stretching conditions were: the temperature of a preheating zone=140° C., the temperature of a stretching zone=135° C., the temperature of a heat setting zone=130° C., and the stretching ratio=4.5.

The resulting retardation film was measured for its $R_0$, $R_{th}$, and optical axis accuracy. The average of Ro was 70 nm, the difference between the maximum and minimum values of $R_0$ was 10 nm, the $R_{th}$ was 12 nm, the optical axis angle was from −0.5° to +0.5°, and therefore this retardation film was high in optical uniformity. This retardation film was disposed on the rear side of a VA-mode liquid crystal cell in the order, a pressure-sensitive adhesive, the retardation film, a pressure-sensitive adhesive, and a polarizing plate, from the liquid crystal cell substrate. On the front side of the liquid crystal cell, a pressure-sensitive adhesive and a polarizing plate were disposed in this order. A backlight was disposed on the rear side of this liquid crystal display device. The liquid crystal cell was evaluated for its viewing angle dependency on the basis of the degree of light leakage caused by change in viewing angle in a black display state where no voltage was applied. If less light leakage was recognized when viewed from any direction, the viewing angle dependency is low and the retardation film is judged to have good viewing angle characteristic. It was confirmed that the liquid crystal display device of this example leaked only a small amount of light when it was viewed from either the normal direction or the oblique direction and, therefore, it was superior in viewing angle characteristic.

Comparative Example 1

A retardation film was prepared in the same manner as Example 1 except for using the following transverse stretching conditions.

The transverse stretching conditions were: the temperature of all of the preheating zone, the stretching zone and the heat setting zone=136° C., the line speed=1 m/min, and the stretching ratio=3.5. The resulting retardation film had an in-plane retardation of 70 nm, a difference between the maximum and minimum values of retardation of 16 nm, an optical axis angle of from −2° to +2°. Therefore, it was not able to obtain a product high in optical uniformity.

INDUSTRIAL APPLICABILITY

By use of the method of the present invention, a polypropylene resin retardation film having a high axis accuracy and a uniform retardation can be obtained. Polypropylene resin retardation films produced using the method of the present invention are free from unevenness in retardation or in optical axis derived from optical irregularities and are excellent in an effect of improving the viewing angle dependency particularly when they are used in large-screen liquid crystal display devices such as a large-screen liquid crystal television. Moreover, the liquid crystal display device of the present invention containing the retardation film having uniform retardation is excellent in viewing angle characteristics and durability.

The invention claimed is:

1. A method for producing a retardation film of a polypropylene resin, the method comprising subjecting a film of a polypropylene resin to longitudinal stretching and transverse stretching which are performed sequentially, wherein the transverse stretching comprises the following steps:
 a step of preheating the film at a preheating temperature which is equal to or higher than the melting point of the polypropylene resin;
 a step of stretching the preheated film in the transverse direction at a stretching temperature which is lower than the preheating temperature; and
 a step of heat setting the film stretched in the transverse direction.

2. The method for producing a retardation film of a polypropylene resin according to claim 1, wherein the polypropylene resin is a propylene-based random copolymer.

3. The method for producing a retardation film of a polypropylene resin according to claim 1, wherein the longitudinal stretching is performed by a long-span stretching method in an air floating oven.

4. A retardation film of a polypropylene resin produced by the production method according to claim 1.

5. The retardation film of a polypropylene resin according to claim 4, wherein the difference between the maximum and minimum values of retardation is 10 nm or less and has an optical axis of from −1° to +1°.

6. A liquid crystal display device comprising the polypropylene resin retardation film according to claim 4.

* * * * *